US010587206B1

(12) United States Patent
Xiao et al.

(10) Patent No.: US 10,587,206 B1
(45) Date of Patent: Mar. 10, 2020

(54) CLAMP CONTROL BASED ON A CONVERTER OUTPUT SUPPLY VOLTAGE MODE AND A CONVERTER INPUT SUPPLY VOLTAGE MODE

(71) Applicant: TEXAS INSTRUMENTS INCORPORATED, Dallas, TX (US)

(72) Inventors: BoQiang Xiao, Tucson, AZ (US); Andres Arturo Blanco, Dallas, TX (US); Yogesh Kumar Ramadass, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/257,915

(22) Filed: Jan. 25, 2019

Related U.S. Application Data (60) Provisional application No. 62/719,190, filed on Aug. 17, 2018, provisional application No. 62/786,877, filed on Dec. 31, 2018.

(51) Int. Cl.
*H02M 7/487* (2007.01)
*H02M 3/07* (2006.01)
*H02M 7/217* (2006.01)

(52) U.S. Cl.
CPC ............. *H02M 7/487* (2013.01); *H02M 3/07* (2013.01); *H02M 7/217* (2013.01)

(58) Field of Classification Search
CPC ............ H02M 3/02; H02M 3/06; H02M 3/07; H02M 7/217; H02M 7/483; H02M 7/487
See application file for complete search history.

(56) References Cited

U.S. PATENT DOCUMENTS

| 6,215,683 B1* | 4/2001 | Mao ...................... H02M 1/10 363/142 |
| 2016/0131709 A1* | 5/2016 | Yoo .................. G01R 31/31721 324/762.01 |
| 2016/0344293 A1* | 11/2016 | Hari .................. H02M 3/33507 |
| 2019/0006957 A1* | 1/2019 | Ito ........................ H02M 7/483 |

FOREIGN PATENT DOCUMENTS

WO   WO-2018195952 A1 * 11/2018 ........ H02M 3/33569

* cited by examiner

*Primary Examiner* — Matthew V Nguyen
(74) *Attorney, Agent, or Firm* — Tuenlap Chan; Charles A. Brill; Frank D. Cimino (57) ABSTRACT

A system includes a clamp circuit configured to regulate a converter input supply voltage based on control signals. The system also includes a converter configured to the adjust the converter input supply voltage to a converter output supply voltage. The system also includes a controller configured to adjust the control signals for the clamp circuit using a first mode based on the converter output supply voltage and a second mode based on the converter input supply voltage.

21 Claims, 7 Drawing Sheets

CLAMP CONTROL BASED ON A CONVERTER OUTPUT SUPPLY VOLTAGE MODE AND A CONVERTER INPUT SUPPLY VOLTAGE MODE

CROSS-REFERENCE TO RELATED APPLICATIONS

This application claims priority to U.S. Provisional Application No. 62/719,190 filed Aug. 17, 2018, titled "Apparatus for Dynamic Monitoring Active Clamp Capacitor-Drop Power Supplies," and U.S. Provisional Application No. 62/786,877, filed Dec. 31, 2018, titled "Active Clamp Control Based on a Converter Output Supply Voltage Mode and a Converter Input Supply Voltage Mode" which are hereby incorporated herein by reference in their entirety.

BACKGROUND

Clamp power supplies are used as part of an ongoing push to make power supplies smaller and more efficient. An example clamp power supply includes a clamp circuit in parallel with the input of a switching regulator. Under steady state load conditions, the clamp circuit does nothing, i.e., it appears as high impedance. If an abrupt load change occurs which is sufficient to cause the output voltage of the switching regulator to exceed a certain tolerance band, the clamp circuit will turn on and shunt additional charging current to ground. Accordingly, when the output of the voltage switching regulator drops below a threshold, the clamp turns off. The output voltage of the switching regulator begins to recover as the input charges. A similar function is needed when the load changes from high to low. Since the inductor current cannot decrease instantaneously, the output voltage will increase, at which point clamp circuit would turn on and sink current.

SUMMARY

In accordance with at least one example of the disclosure, a system comprises a clamp circuit configured to regulate a converter input supply voltage based on control signals. The system also comprises a converter configured to the adjust the converter input supply voltage to a converter output supply voltage. The system also comprises a controller configured to provide clamp control for the clamp circuit based on a converter input supply voltage mode and a converter output supply voltage mode.

In accordance with at least one example of the disclosure, a device comprises a clamp circuit configured to regulate a converter input supply voltage based on control signals. The device also comprises a converter configured to the reduce the converter input supply voltage to an LDO input supply voltage. The device also comprises an LDO configured to provide an output voltage based on the LDO input supply voltage. The device also comprises a controller configured to selectively adjust the control signals for the clamp circuit using a first clamp control mode based on the LDO input supply voltage and a second clamp control mode based on the converter input supply voltage.

In accordance with at least one example of the disclosure, a device comprises a clamp circuit with two clamp switches. The device also comprises a converter circuit coupled to an output node of the clamp circuit. The device also comprises an LDO circuit coupled to an output node of the converter circuit. The device also comprises a controller coupled to an input node of the LDO circuit and to an input node of the converter circuit. The controller comprises a multiplexer for a LDO input supply voltage node and a converter input supply voltage node. The controller also comprises a voltage divider coupled to an output node of the multiplexer. The controller also comprises a comparator coupled to an output node of the voltage divider, wherein an output node of the comparator is coupled to the clamp circuit.

BRIEF DESCRIPTION OF THE DRAWINGS

For a detailed description of various examples, reference will now be made to the accompanying drawings in which.

DETAILED DESCRIPTION

Disclosed herein are controller options for various scenarios involving a clamp circuit (with or without AC rectifier components) and an N:1 converter. As used herein, an "clamp circuit" refers to a circuit configured to maintain the input supply voltage for a power converter within range of a target supply voltage. In some examples, the controller options for the various scenarios include a first clamp control mode based on a converter output supply voltage and second clamp control mode based on a converter input supply voltage. The controller options also turning the N:1 converter on and off depending on a monitored parameter of the converter output supply voltage. In some scenarios, the N:1 converter is coupled to a load. In other scenarios, the N:1 converter is coupled to a low dropout regulator (LDO).

In scenarios involving an LDO, the LDO input supply voltage (an example of a converter output supply voltage) is regulated based on the controller options. More specifically, the controller options for such LDO scenarios include clamp control modes, where the LDO input supply voltage or the converter input supply voltage is monitored and used to adjust clamp operations to regulate the LDO input. More specifically, the LDO input supply voltage is monitored and used to adjust clamp circuit operations in a first clamp control mode (referred herein as mode 1 or an LDO input supply voltage mode), where the N:1 converter is on. Alternatively, the converter input supply voltage is used to adjust clamp circuit operations in a second clamp control mode (referred herein as mode 2 or a converter input supply voltage mode), where the N:1 converter is off.

In some examples, a controller with clamp control options in use (e.g., when an input node of a clamp circuit is coupled to a supply voltage) switches between the clamp control options (e.g., clamp control modes 1 and 2) by monitoring if the LDO input supply voltage exceeds an upper threshold or falls below a lower threshold. For example, if the LDO input supply voltage exceeds an upper threshold, a controller switches from clamp control mode 1 to clamp control mode 2. On the other hand, if the LDO input supply voltage drops below the lower threshold, the controller switches from clamp control mode 2 to clamp control mode 1.

In some N:1 converter and LDO scenarios, the controller is configured to support include direct-current (DC) bypass options as well as the clamp control options. The DC bypass options are used, for example, if a designer chooses to bypass the clamp circuit (by providing a converter input supply voltage directly at the output of the clamp circuit instead of providing a supply voltage at the input of the clamp circuit). In some examples, the DC bypass options for a controller include first and second DC bypass modes, where the LDO input supply voltage is monitored and is used to turn the N:1 converter on or off. In other words, the first DC bypass mode is a N:1 converter on mode, and the second DC bypass mode is a N:1 converter off mode. For example, if the DC bypass modes are in use, a controller switches from the first DC bypass mode (N:1 converter on mode) to the second DC bypass mode (N:1 converter off mode) when the LDO input supply voltage is greater than an upper threshold. Also, a controller switches from the second DC bypass mode (N:1 converter off mode) to the first DC bypass mode (N:1 converter on mode) when the LDO input supply voltage is less than a lower threshold.

To summarize, different N:1 converter and LDO scenarios are possible. In an example N:1 converter and LDO scenario, a clamp circuit with a current input is in use, and the clamp control modes described herein are used to regulate an LDO input. In another N:1 converter and LDO scenario, an alternating current (AC) rectifier and clamp circuit is in use (an AC voltage supply is coupled to positive and negative inputs of the AC rectifier and clamp circuit), and the clamp control modes described herein are used to regulate an LDO input. With either of these N:1 converter and LDO scenarios, a designer may choose to bypass the clamp circuit (or the AC rectifier and clamp circuit). In such case, the controller uses the DC bypass mode options described herein to regulate the LDO input.

One way to control a clamp circuit is to monitor and regulate the charge pump supply voltage (CP_IN) to be N times higher than the LDO output voltage (LDO_OUT) plus a target dropout (CP_IN=N*(LDO_OUT+V_DROPOUT)). However, depending on the load current and the output impedance of the charge pump, a significant voltage drop across the charge pump deviates the N ratio to be higher. This error can eat into and violate the minimum dropout budget at the highest current load (V_DROPOUT min=VLDO_IN min−VLDO_OUT). Error due to a significant voltage drop across the charge pump also reduces overall efficiency as the LDO will need a larger dropout budget to account for charge pump IR losses.

Accordingly, in some examples, a system comprises a clamp circuit configured to regulate a converter input supply voltage based on control signals. The system also comprises a N:1 converter (e.g., a charge pump) configured to the adjust the converter input supply voltage to a converter output supply voltage (e.g., an LDO input supply voltage). The system also comprises a controller configured to adjust the control signals for the clamp circuit based on a first mode in which the N:1 converter is on and a second mode in which the N:1 converter is off. With the first mode (N:1 converter on), the controller provides control signals for the clamp circuit based on the converter output supply voltage. In an example LDO scenario, this alleviates the charge pump IR losses mentioned previously and allows LDO_IN (the converter output supply voltage) to be regulated to a fixed level regardless of load. With the second mode (N:1 converter off), the controller provides control signals for the clamp circuit based on the N:1 converter input supply voltage. In some examples, the controller is also configured to support DC bypass modes, where the clamp circuit is bypassed, and the N:1 converter is turned on or off.

In some examples, the controller comprises a multiplexer with an LDO input supply voltage node and a converter input supply voltage node. The controller also comprises a voltage divider coupled to an output node of the multiplexer. The controller also comprises a comparator coupled to an output node of the voltage divider, wherein an output node of the comparator couples to the clamp circuit. In operation, the controller adjusts control signals to the clamp circuit based on a first clamp control mode (mode 1 herein) in which the converter is on and a second clamp control mode (mode 2 herein) in which the converter is off. In one example, in the first mode, the controller provides control signals to the clamp circuit based on the relationship $LDO_{IN}=LDO_{OUT}+V_{DROPOUT}$. In other words, in mode 1, the controller directs the clamp circuit based on the value of $LDO_{IN}$. Meanwhile, in mode 2, the controller provides control signals to the clamp circuit based on the relationship $CP_{IN}=N*LDO_{IN}=N*(LDO_{OUT}+V_{DROPOUT})$. In other words, in mode 2, the controller directs the clamp circuit based on the value of $CP_{IN}$. In some examples, the controller is also configured to support DC bypass modes, where the clamp circuit is bypassed, and the N:1 converter is turned on or off. To provide a better understanding, various clamp control options and related systems and methods are described using the figures as follows.

Figure 1:
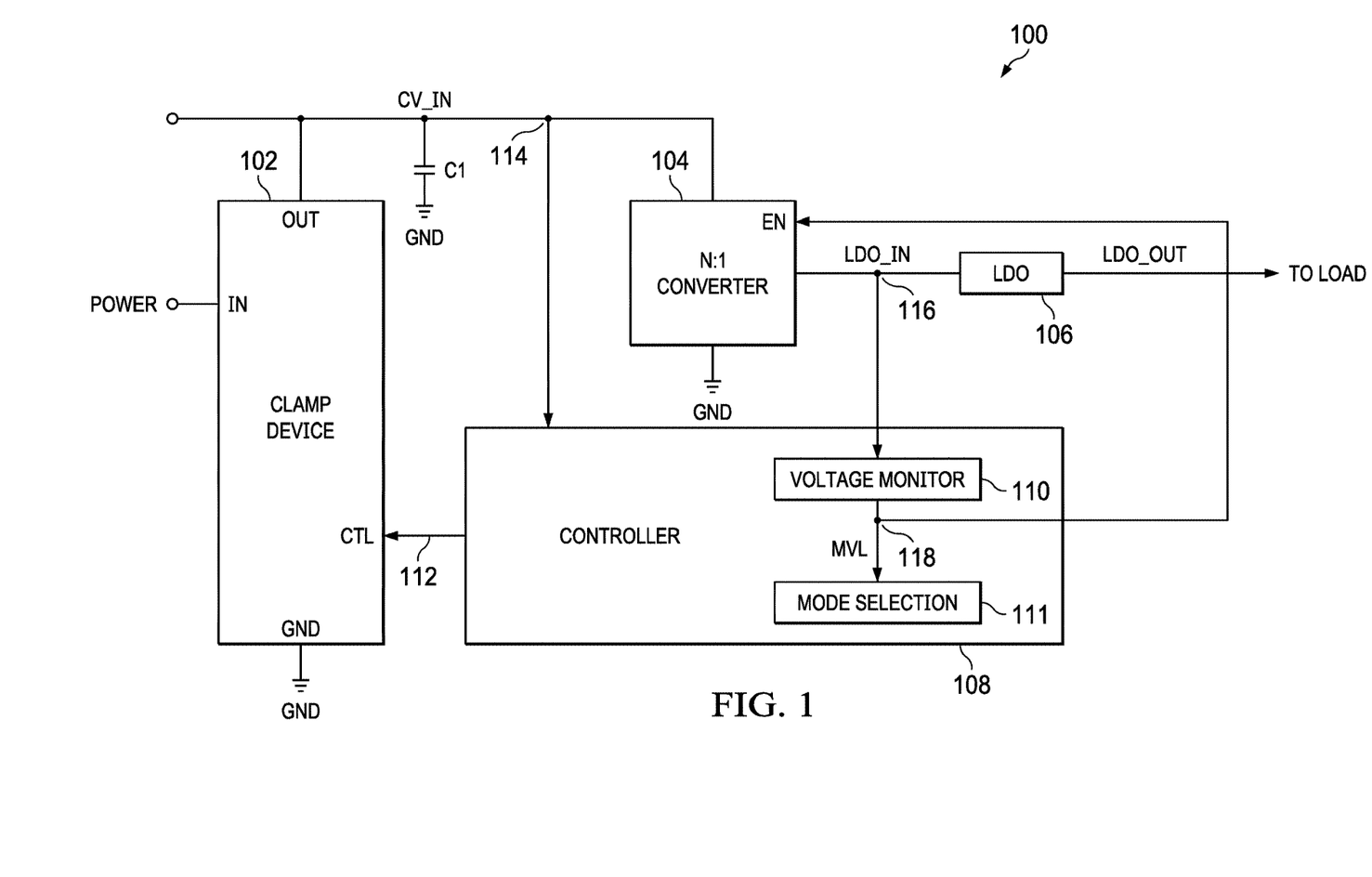
FIG. 1 is a block diagram showing a system in accordance with various examples.

FIG. 1 is a block diagram showing a system 100 in accordance with various examples. As shown, the system 100 includes a clamp device 102 in parallel with a capacitor (C1) and a N:1 converter 104, where the clamp device 102 includes an input node (IN) configured to receive an input current. When the input current is provided to IN of the clamp device 102, the controller 108 uses the clamp control options such as clamp control modes 1 and 2 described herein. When power is not provided to IN of the clamp device 102, the controller 108 uses DC bypass options such as the DC bypass modes described herein. The clamp device 102 also includes an output node (OUT), where the voltage signal at OUT in a clamped version of the power at IN (when power is provided to IN). If a system designer chooses to bypass the clamp device 102, the N:1 supply voltage (CV_IN) is provided directly to the N:1 converter 104. The output of the N:1 converter 104 is coupled to an LDO 106.

When the clamp device 103 is in use, the N:1 converter 104 receives a converter input supply voltage (CV_IN), where CV_IN is adjusted by the clamp device 102 based on controls signals 112 from the controller 108. The output of the N:1 converter 104 is an LDO input supply voltage (LDO_IN) for the LDO 106, where LDO_IN=CV_IN/N.

As shown, the controller 108 receives CV_IN and LDO_IN. More specifically, the controller 108 is coupled to a converter input supply voltage node 114 (at the input side of the N:1 converter 104) to receive CV_IN. The controller 108 is also coupled to an LDO input supply voltage node 116 (at the output side of the converter 104) to receive LDO_IN. In the example of FIG. 1, the controller 108 includes a voltage monitor circuit 110 and mode selection logic 111. When the clamp device 102 is in use (not bypassed), the output of the voltage monitor circuit 100 is a monitored voltage level (MVL) that is used by the mode selection logic 111 to switch between clamp control mode 1 and mode 2. Also, MVL is used to turn the N:1 converter 104 on or off regardless of whether the clamp device 102 is in use or is bypassed.

In the example of FIG. 1, MVL is provided to an enable node (EN) of the N:1 converter 104 to turn the N:1 converter 104 on or off. More specifically, if LDO_IN is above an upper threshold, then MVL is set to a logical "1". On the other hand, if LDO_IN is below a lower threshold, then MVL is set to a logical "0". The difference between the upper and lower thresholds is a hysteresis value that helps ensure MVL does not switch between 0 and 1 too often and/or due to noise. In such examples, when MVL is 1, the N:1 converter 104 is turned off. On the other hand, when MVL is 0, the converter 104 is turned on.

Besides being used to turn the N:1 converter 104 on or off, MVL is also used by the mode selection logic 111 to determine the clamp control mode to be used by the controller 108 when the clamp device 102 is in use. In some examples, when MVL is 1, the controller 108 operates in mode 2, where N:1 converter 104 is off and CV_IN is used to adjust the control signals 112 for the clamp device 102. More specifically, in mode 2 (when MVL is 1 and the N:1 converter 104 is off), the controller 108 monitors CV_IN and adjusts the control signals 112 for the clamp device 102 to maintain the relationship: CV_IN=N*(LDO_OUT+ V_DROPOUT), where V_DROPOUT is a predetermined voltage drop between LDO_IN and LDO_OUT due to the LDO 106. In contrast, in mode 1 (when MVL is 0 and the N:1 converter 104 is on), the controller 108 monitors LDO_IN and adjusts the control signals 112 for the clamp device 102 to maintain the relationship: LDO_IN=LDO_OUT+V_DROPOUT.

In the above example, the controller 108 directs the clamp device 102 so that when the N:1 converter 104 is on, mode 1 is used and LDO_IN is sufficient to maintain LDO_OUT+ V_DROPOUT. For higher LDO_OUT parts, in response to a light load condition while the N:1 converter 104 is on, LDO_IN may surpass the upper threshold used by the voltage monitor circuit 110, resulting in MVL=1. In one example, assume the overvoltage kicks in at 5.75V on an overshoot on LDO_IN and assume an LDO_OUT is programmed close to that limit (i.e. 5.0V). In such case, in an unload event, the LDO_IN (5.0+0.6V) would overshoot above the 5.75V overvoltage threshold and trigger MVL=1. Also, LDO_OUT will vary based on the overshoot amount. For example, if overshoot is by 300 mV on an unload event, then any LDO_OUT higher than 4.85V (e.g., 5.75V-0.3V-0.6V) and would trip the overvoltage on an unload.

With MVL=1, the N:1 converter 104 is turned off and the controller 108 uses clamp control mode 2 to provide control signals 112 to direct the clamp device 102 (e.g., via a respective node of the clamp device 102) to maintain CV_IN at N*(LDO_OUT+V_DROPOUT). With the N:1 converter 104 turned off, LDO_IN will drop over time. Eventually, LDO_IN will drop below the lower threshold used by the voltage monitor circuit 110, resulting in MVL=0. When MVL=0, the N:1 converter 104 is turned on and the controller 108 provides control signals 112 using clamp control mode 1 to direct the clamp device 102 to maintain LDO_IN=LDO_OUT+V_DROPOUT. With the clamp control technique described for FIG. 1, the voltage drops of the N:1 converter 104 and the LDO 106 are accounted for to efficiently regulate power for the LDO 106.

Figures 2, 3:
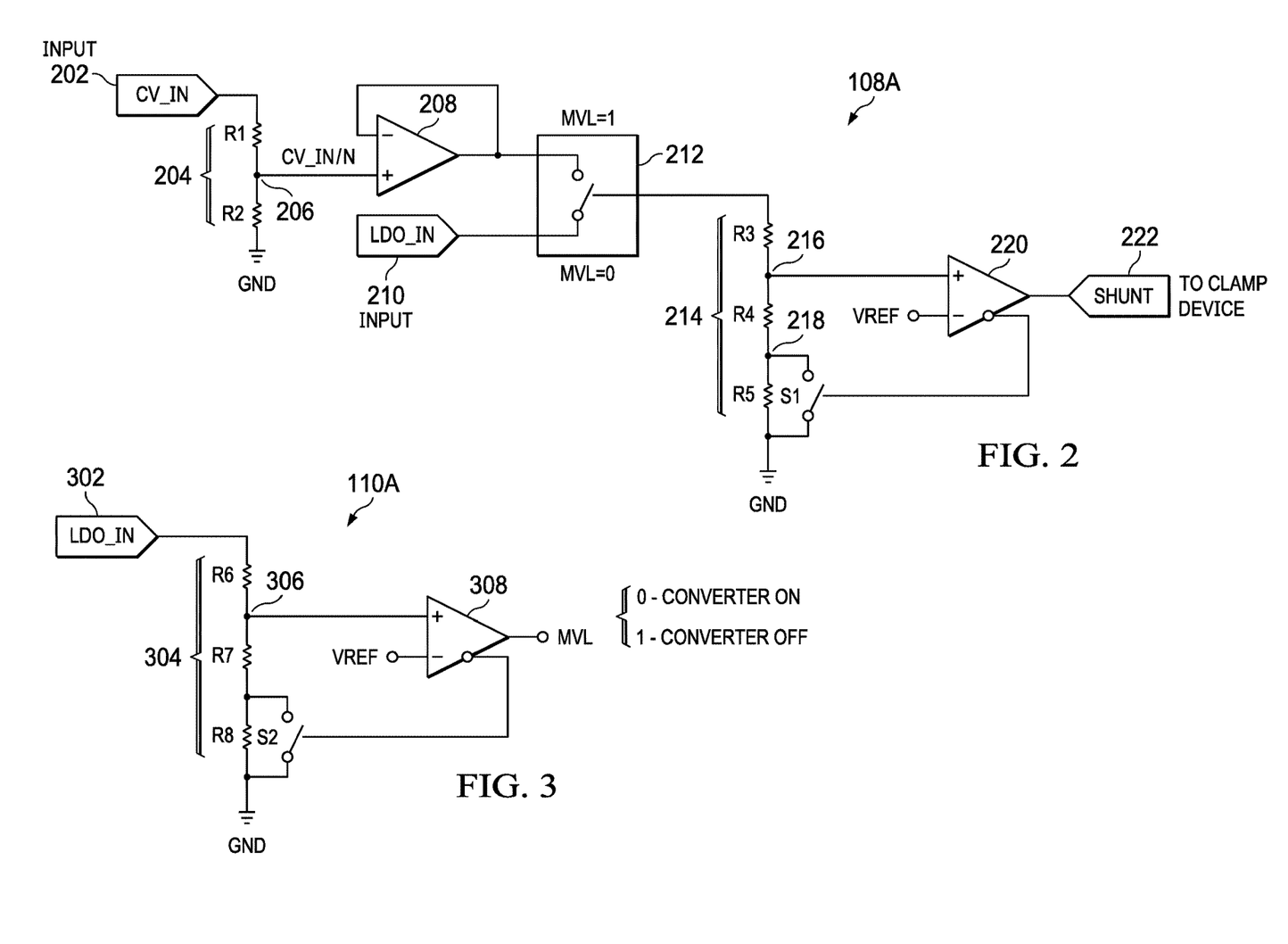
FIG. 2 is a schematic diagram of a controller circuit in accordance with various examples.
FIG. 3 is a schematic diagram of a voltage monitor circuit for a controller in accordance with various examples.

FIG. 2 is a schematic diagram of a controller circuit 108A (e.g., part of the controller 108 in FIG. 1) in accordance with various examples. The controller circuit 108A is used, for example, to provide clamp control options (e.g., control signals 112 in FIG. 1) for a clamp circuit (e.g., the clamp device 102 of FIG. 1) in an LDO scenario. As shown, the controller circuit 108A of FIG. 2 includes a first input node 202 configured to receive CV_IN. The controller circuit 108A also includes a first voltage divider 204 with resistors R1 and R2, where R1 and R2 are selected such that a node 206 between R1 and R2 is set to CV_IN/N (the value of R1 is N times the value of R2). This N is the same as the converter N:1 ratio. In the example of FIG. 2, the node 206 is coupled to an operational amplifier 208 with unity gain (the output of the operational amplifier is CV_IN/N.

As shown, the controller circuit 108A of FIG. 2 also comprises a multiplexer 212 that forwards either the output of the operational amplifier 208 (CV_IN/N) or LDO_IN, where LDO_IN is provided to the multiplexer 212 from a second input node 210 (e.g., a mode select node) for the controller circuit 108A. In some examples, the control signal for the multiplexer 212 is MVL. In some examples, when MVL=1, the controller circuit 108A operates in mode 2, where CV_IN/N is output from the multiplexer 212 to a second voltage divider 214 with resistors R3 and R4. Otherwise, when MVL=0, the controller circuit 108A operates in clamp control mode 1, where LDO_IN is output from the multiplexer 212 to the second voltage divider 214.

As shown, the voltage divider 214 includes a node 216 between R3 and R4, where the voltage level at node 216 is a function of R3 and R4. The voltage level at the node 216 is input to a comparator 220. In the example of FIG. 2, the voltage divider 214 optionally includes R5, which is selectively bypassed using a switch, S1. In some examples, the control signal for S1 is the inverse of the output from the comparator 220. In the example of FIG. 2, R5 is used to set the hysteresis of the comparator (e.g., -100 mV), and R3 and R4 are used to set the clamp trip points depending on LDO_OUT, VDROP_OUT, and Vref. In some examples, R3=0.8 of the total resistance (R3+R4+R5), R4=0.18 of the total resistance, and R5=0.02 of the total resistance. In one example, Vref is the bandgap (1.2V), VDROP_OUT is 0.6V, and LDO_OUT is 3.3 or 5V. In other examples, the values for LDO_OUT, VDROP_OUT, and Vref vary. Meanwhile, the output of the comparator 220 is provided to an output node 222 of the controller 108A for use as a control signal (e.g., the control signals 112 of FIG. 1) for a clamp circuit such as a clamp circuit of the clamp device 102 of FIG. 1. In different examples, the output node 222 is logic high or low (e.g., 5V when LDO_IN/CV_IN is too high or 0V when LDO_IN/CV_IN is too low).

FIG. 3 is a schematic diagram of a voltage monitor circuit 110A (an example of the voltage monitor circuit 110 of FIG. 1) for a controller (e.g., the controller 108 in FIG. 1) in accordance with various examples. As shown, the voltage monitor circuit 110A includes an input node 302 coupled to a voltage divider 304 with resistors R6 and R7. As shown, the voltage divider 304 includes a node 306 between R6 and R7, where the voltage level at node 306 is a function of R6 and R7. The voltage level at the node 306 is input to a comparator 308. In the example of FIG. 3, the voltage divider 304 optionally includes R8, which is selectively bypassed using a hysteresis switch, S2. In some examples, the control signal for S2 is the inverse of the output from the comparator 308. In the example of FIGS. 3, R6 and R7 are sized for the comparator 308 to trip at the maximum voltage for the components powered off of LDO_IN, and R8 is sized for a target hysteresis (e.g., -100 mV). In some examples, R6=0.79 of the total resistance (R6+R7+R8), R7=0.19 of the total resistance, and R8=0.02 of the total resistance. The output of the comparator 308 corresponds to MVL and is used turn an N:1 converter (e.g., the N:1 converter 104 of FIG. 1) on and off. When a clamp device (e.g., the clamp device 102 in FIG. 1) is in use, MVL is also provided to mode selection logic 111 of a controller (e.g., the controller 108A of FIG. 2, or the controller 108 of FIG. 1) to select clamp control mode as described herein (e.g., to direct the multiplexer 212 of FIG. 2).

Figure 4:
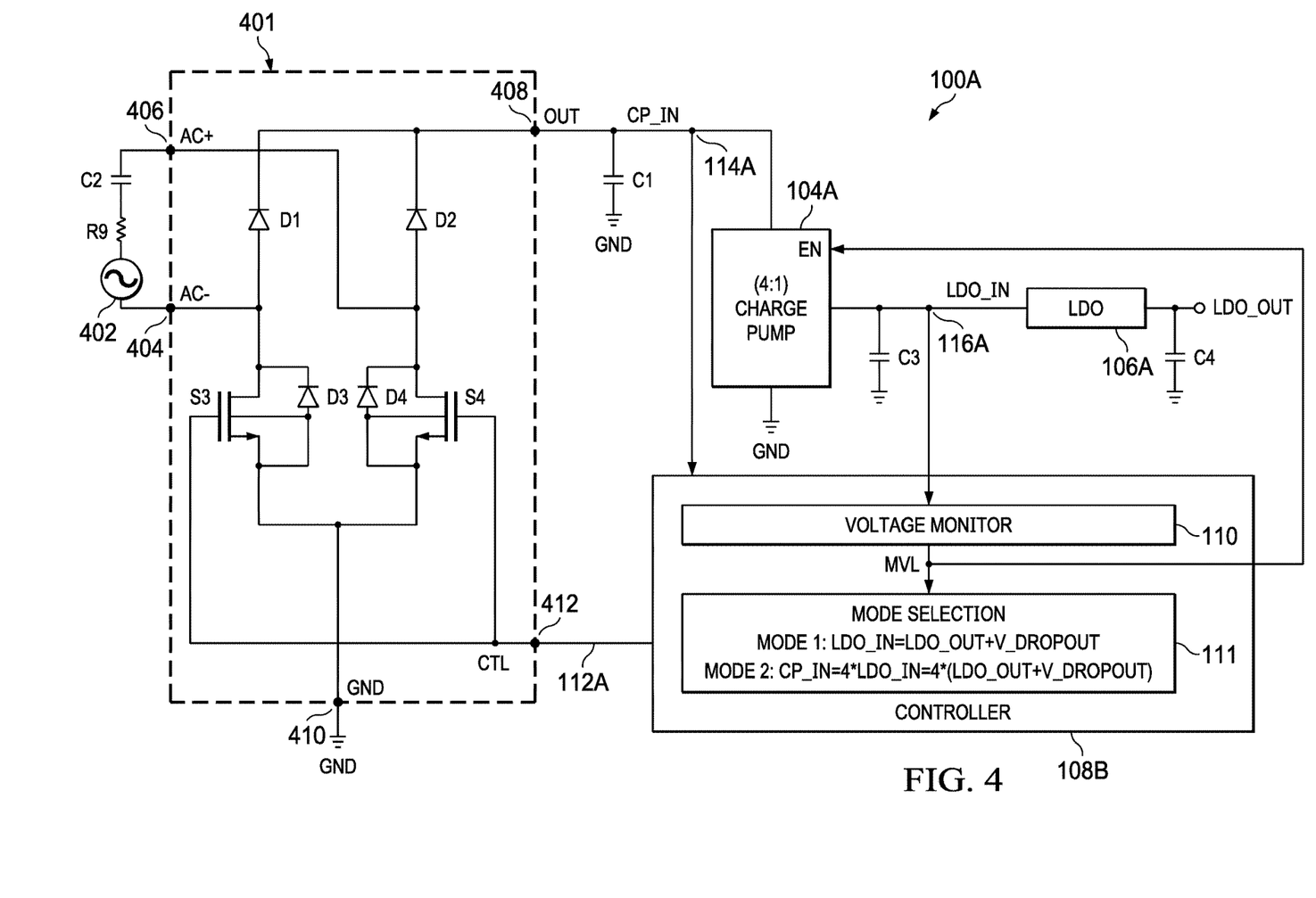
FIG. 4 is a diagram showing another system in accordance with various examples.

FIG. 4 is a diagram showing another system 100A (an example of the system 100 in FIG. 1) in accordance with various examples. As shown, the system 100A includes an AC rectifier and clamp device 401 coupled in parallel with a capacitor (C1) and a 4:1 charge pump 104A (an example of the N:1 converter 104 of FIG. 1). When in use, the AC rectifier and clamp device 401 regulates the charge pump supply voltage (CP_IN, which is an example of CV_IN in FIG. 1), which is stored by C1 and provided to the charge pump 104A. The output of the 4:1 charge pump 104A is LDO_IN, which is provided to a decoupling capacitor (C3) and is input to an LDO 106A (an example of the LDO 106 of FIG. 1). The output of the LDO 106A is provided to another decoupling capacitor (C4) and is input to a load (not shown).

In the example of FIG. 4, the AC rectifier and clamp device 401 includes a clamp circuit that includes a pair of clamp switches, S3 and S4, in the form of NMOS transistors with respective control terminals coupled to the controller 108B (an example of the controller 108 in FIG. 1, or the controller 108A in FIG. 2). As shown, in some examples, each of the transistors for S3 and S4 also includes first and second current terminals with an integrated body diode (e.g., D3 for S3, and D4 for S4) between the first and second current terminals. Also, the second current terminals of S3 and S4 are coupled to a ground node 410 of the AC rectifier and clamp device 401. In other examples, the components and/or arrangement of components used for S3 and S4 varies. In one example, PMOS transistors are used instead of NMOS transistors.

In the example of FIG. 4, the AC rectifier and clamp device 401 also includes bridge AC rectifier components such as diodes, D1 and D2, which operate to rectify an AC signal received at AC input nodes 404 and 406. More specifically, the first current terminal of S3 is coupled to the anode of D1, while the first current terminal of S4 is coupled to the anode of D2. In FIG. 4, the cathodes of D1 and D2 are coupled to an output node 408 of the AC rectifier and clamp device 401. In different examples, D1 and D2 correspond to synchronous switches, the 4:1 charge pump 104A is an inductor switching converter, and/or the LDO 106A is not used (LDO_IN can be output of system). When an LDO is not used, the N:1 converter output is provided to a load. In this case, the converter output (CV OUT) is used instead of LDO_IN for the controller options described herein.

In the example of FIG. 4, the AC signal provided to the AC input nodes 404 and 406 of the AC rectifier and clamp device 401 is provided by an AC source 402 in series with a resistor (R9) and a capacitor (C2). In operation, D1-D4 rectify the AC signal at the AC input nodes 404 and 406, while S3 and S4 regulate CP_IN for the 4:1 charge pump 104A. If the AC rectifier and clamp device 401 is bypassed, the controller 108B provides DC bypass modes to regulate LDO_IN. In some examples, the controller 108B provides the DC bypass modes using a voltage monitor 110B (an example of the voltage monitor 110 in FIG. 1, or the voltage monitor 110A in FIG. 3). More specifically, when MVL transitions from 1 to 0, the controller 108B switches from a second DC bypass mode (4:1 charge pump off) to a first DC bypass mode (4:1 charge pump 104A on). Also, when MVL transitions from 1 to 0, the controller 108B switches from the first DC bypass mode (4:1 charge pump on) to a second DC bypass mode (4:1 charge pump 104A off).

For the clamp control modes, the controller 108B uses the voltage monitor circuit 110B and the mode selection logic 111A to provides control signals 112A (an example of the control signals 112 in FIG. 1) for S3 and S4 via a control node 412 to the AC rectifier and clamp device 401, where the control signals 112A are based on clamp control mode 1 and clamp control mode 2 as described herein. In one example, clamp control mode 2 of the controller 108B directs S3 and S4 to regulate CP_IN based on the relationship CP_IN=4*LDO_IN=4*(LDO_OUT+V_DROPOUT). More specifically, clamp control mode 2 of the controller 108B is used when the 4:1 charge pump 104A is turned off. In contrast, clamp control mode 1 of the controller 108B directs S3 and S4 to regulate LDO_IN based on the relationship LDO_IN=LDO_OUT+V_DROPOUT. In some examples, a voltage monitor circuit 110A (an example of the voltage monitor circuit 110 in FIG. 1) monitors LDO_IN and provides MVL as described in FIG. 1, where MVL is used by the controller 108B to select between clamp control mode 1 and clamp control mode 2 (e.g., MVL is provided to a mode select node of the controller 108B). Also, MVL is used to turn the 4:1 charge pump 104A on or off in overvoltage conditions on LDO_IN (e.g., MVL is provided to an enable node of the 4:1 charge pump 104A).

When the AC rectifier and clamp device 401 is in use, the controller 108B directs S3 and S4 of the AC rectifier and clamp device 401 so that when the 4:1 charge pump 104A is on and clamp control mode 1 is used, LDO_IN is sufficient to maintain LDO_OUT+V_DROPOUT. In response to a light load (high LDO_OUT) condition while the 4:1 charge pump 104A is on, LDO_IN will surpass the upper threshold used by the voltage monitor circuit 110A, resulting in MVL=1. With MVL=1, the 4:1 charge pump 104A is turned off and the controller 108B uses clamp control mode 2 to provide control signals 112A to direct S3 and S4 of the AC rectifier and clamp device 401 to maintain CV_IN at 4*(LDO_OUT+VDROPOUT). With the 4:1 charge pump 104A turned off, LDO_IN will drop over time. Eventually, LDO_IN will drop below the lower threshold used by the voltage monitor circuit 110A, resulting in MVL=0. When MVL=0, the 4:1 charge pump 104A is turned on and the controller 108B uses clamp control mode 1 to provide control signals 112A to direct S3 and S4 of the AC rectifier and clamp device 401 to maintain LDO_IN at LDO_OUT+V_DROPOUT. With the clamp control technique described for FIG. 4, the voltage drops of the 4:1 charge pump 104A and the LDO 106A are accounted for to efficiently regulate power for the LDO 106A.

With the system 100A, the controller 108B is configured to switch between the first clamp control mode and the second clamp control mode based on a monitored parameter (MVL=0 or 1) of LDO_IN. In different examples, the voltage monitor circuit 110A is coupled to (as shown) or is included with the controller 108B, where the voltage monitor circuit 110A is configured to provide the monitored parameter (MVL=0 or 1) for LDO_IN based on a comparison of the LDO input supply voltage with at least one threshold. In some examples, an upper threshold and a lower threshold are used to provide hysteresis.

With the system 100A, the 4:1 charge pump 104A is configured to be turned off and the controller 108B is configured to operate in clamp control mode 2 in response to the monitored parameter (MVL=1) indicating that LDO_IN is greater than a threshold (e.g., an upper threshold used by the voltage monitor circuit 110A). In clamp control mode 2, the controller 108B adjusts the control signals to the AC rectifier and clamp device 401 based on CP_IN. Also, with the system 100A, the 4:1 charge pump 104A is configured to be turned on and the controller 108B is configured to operate in clamp control mode 1 in response to the monitored parameter (MVL=0) indicating that LDO_IN is less than a lower threshold. In clamp control mode 1, the controller 108B adjusts the control signals to the AC rectifier and clamp device 401 based on the LDO input supply voltage (LDO_IN).

In some examples, the AC rectifier and clamp device 401, the 4:1 charge pump 104A, the LDO 106A, and the controller 108B are components of an integrated circuit. Also, in some examples, the controller 108B in clamp control mode 1 is configured to provide control signals to the AC rectifier and clamp device 401 (e.g., to turn S3 and S4 on or off) based on the relationship $LDO_{IN}=LDO_{OUT}+VDROPOUT$. Also, in some examples, the controller 108B in clamp control mode 2 is configured to provide control signals to the AC rectifier and clamp device 401 (e.g., to turn S3 and S4 on or off) based on the relationship $CP_{IN}=N*(LDO_{OUT}+V_{DROPOUT})$.

Figure 5A:
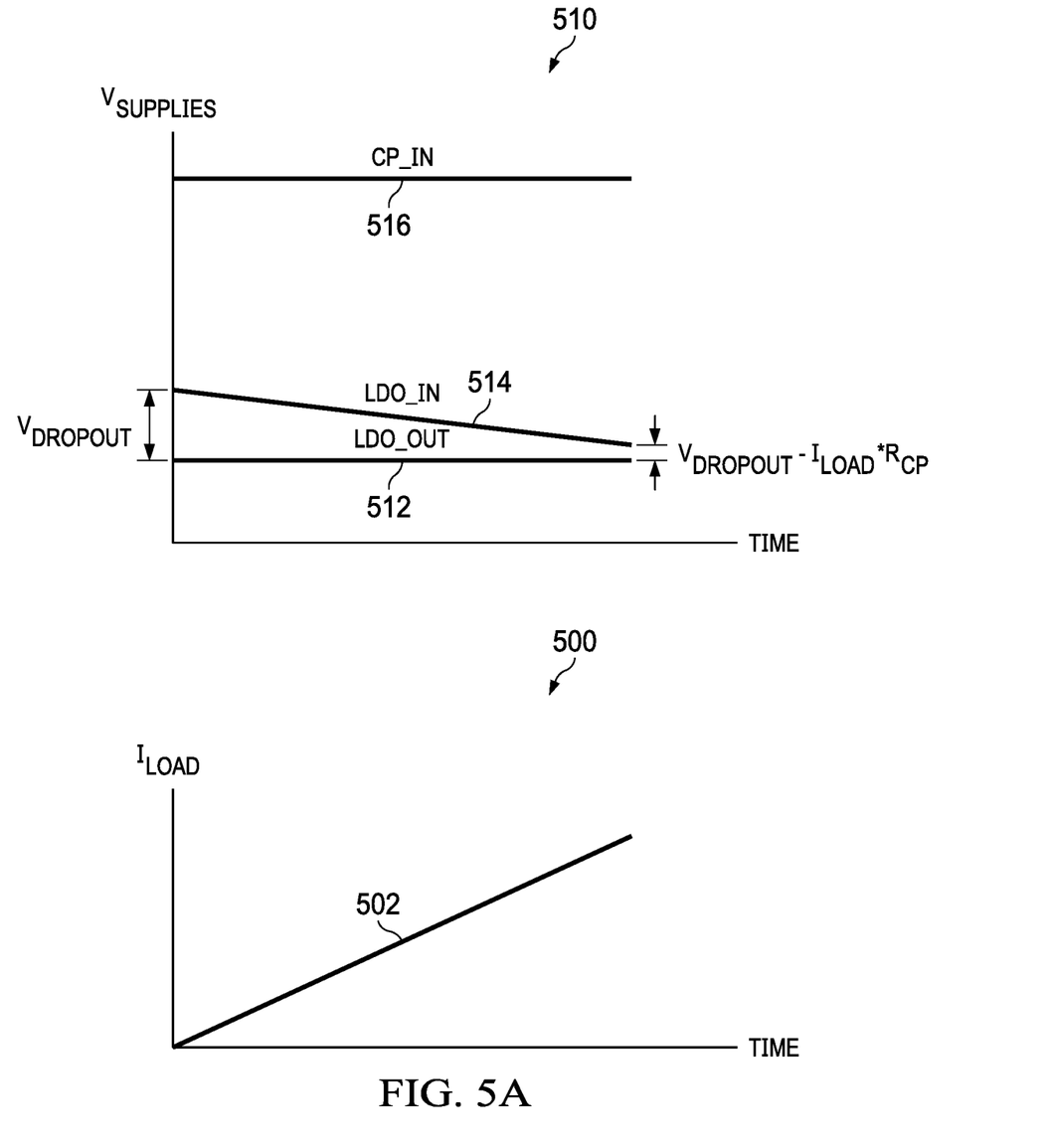
FIGS. 5A and 5B are graphs showing LDO dropout as a function of load current in accordance with various examples.
Figure 5B:
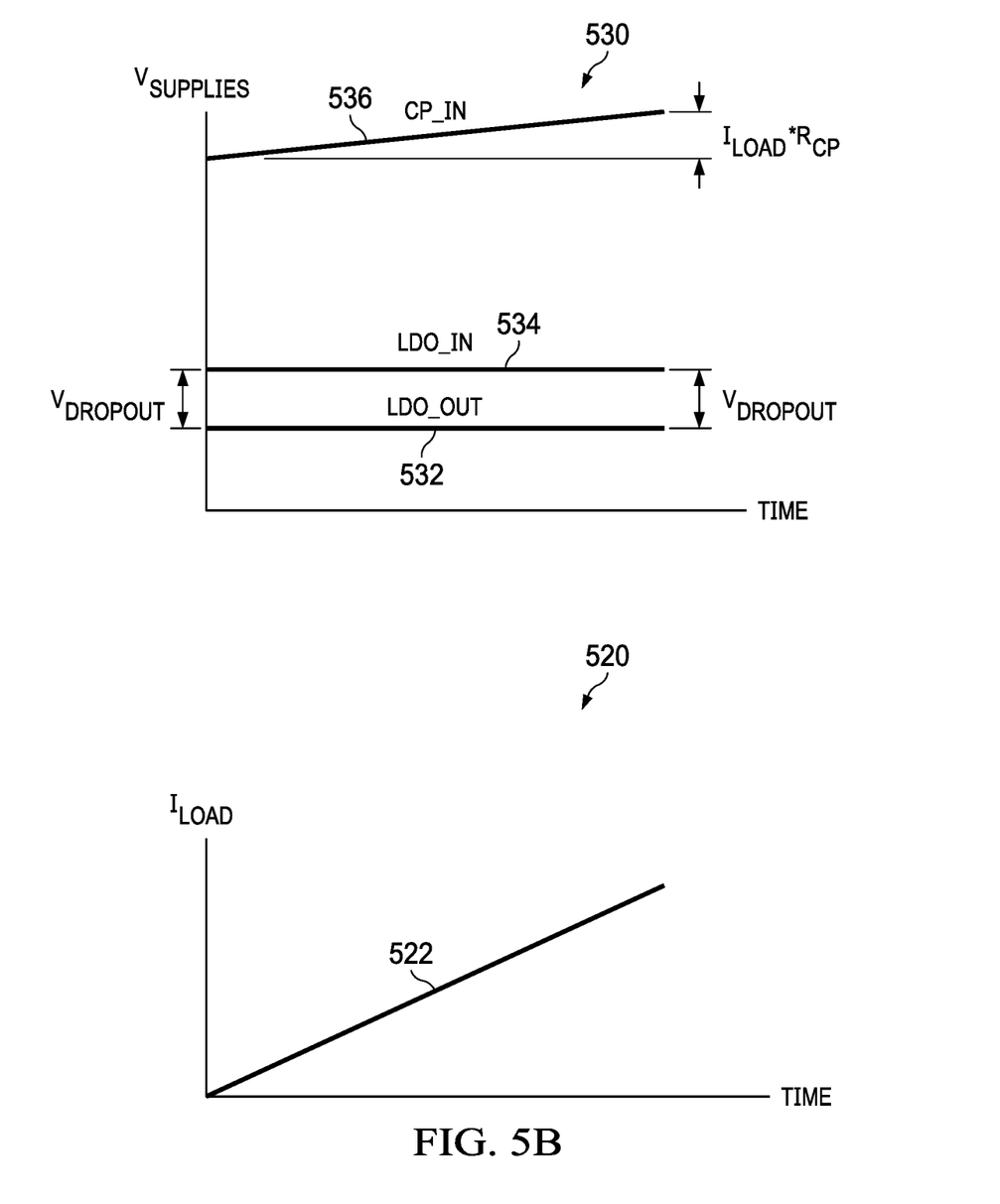

FIGS. 5A and 5B are graphs 500, 510, 520, and 530 showing input and output voltage levels as a function of time and load current as a function of time. More specifically, graphs 500 and 510 in FIG. 5A are directed to a clamp control scheme, where CP_IN is regulated to maintain a fixed relationship with an LDO output voltage (LDO_OUT). In contrast, graphs 520 and 530 in FIG. 5B are directed to a clamp control scheme, where CP_IN is regulated to increase as needed in response to an increasing load current ($I_{LOAD}$).

In graph 500, line 502 represents a load current that increases linearly over time. In graph 510, line 512 represents an LDO output voltage (LDO_OUT) (e.g., from the LDO 106 of FIG. 1, or the LDO 106A of FIG. 4) that is flat as a function of time. Meanwhile, in graph 510, line 516 represents a charge pump supply voltage (CP_IN) that is flat as a function of time (e.g., CP_IN is regulated to maintain a fixed relationship with LDO_OUT). Also, in graph 510, line 514 represents an LDO input supply voltage (LDO_IN) that decreases over time as $I_{LOAD}$ increases. In graph 510, LDO_IN decreases as $I_{LOAD}$ increases according to the relationship $V_{DROPOUT}-I_{LOAD}*R_{CP}$, where $V_{DROPOUT}$ is the voltage drop due to the LDO, $I_{LOAD}$ is the load current, and $R_{CP}$ is the resistance of the charge pump. The problem with the control scheme represented by graphs 500 and 510 of FIG. 5A is that the voltage drop of the N:1 converter (e.g., $R_{CP}$) is not properly accounted for, which causes LDO_IN to decrease over time when $I_{LOAD}$ is increasing. The clamp control scheme represented in FIG. 5A does not properly account for the voltage drop due to the LDO (V_DROPOUT).

In contrast, the clamp control scheme represented by graphs 520 and 530 of FIG. 5B properly accounts for the voltage drop due the LDO (V_DROPOUT). More specifically, in graph 520, line 522 represents a load current that increases linearly over time. In graph 530, line 532 represents an LDO output voltage (LDO_OUT) (e.g., from the LDO 106 of FIG. 1, or the LDO 106A of FIG. 4) that is flat as a function of time. Meanwhile, in graph 530, line 534 represents an LDO input supply voltage (LDO_IN) that stays flat as a function of time even with increasing $I_{LOAD}$. Also, in graph 530, line 536 represents CP_IN as a function of time, where CP_IN increases over time. In the example of FIG. 5B, CP_IN is regulated to account for the effect of $I_{LOAD}$ on LDO_IN according to the relationship $I_{LOAD}*R_{CP}$, where $I_{LOAD}$ is the load current and $R_{CP}$ is the charge pump resistance. In some examples, the clamp control scheme of FIG. 5B represents clamp control mode 1 of a controller (e.g., the controller 108 of FIG. 1, the controller 108A of FIG. 2, or the controller 108B of FIG. 4). In clamp control mode 1 of a controller, an N:1 converter (e.g., a charge pump) is turned on and CP_IN is regulated (e.g., increased as needed due to IR drop) so that LDO_IN is maintained relative to LDO_OUT and V_DROPOUT is accounted for.

Figure 6A:
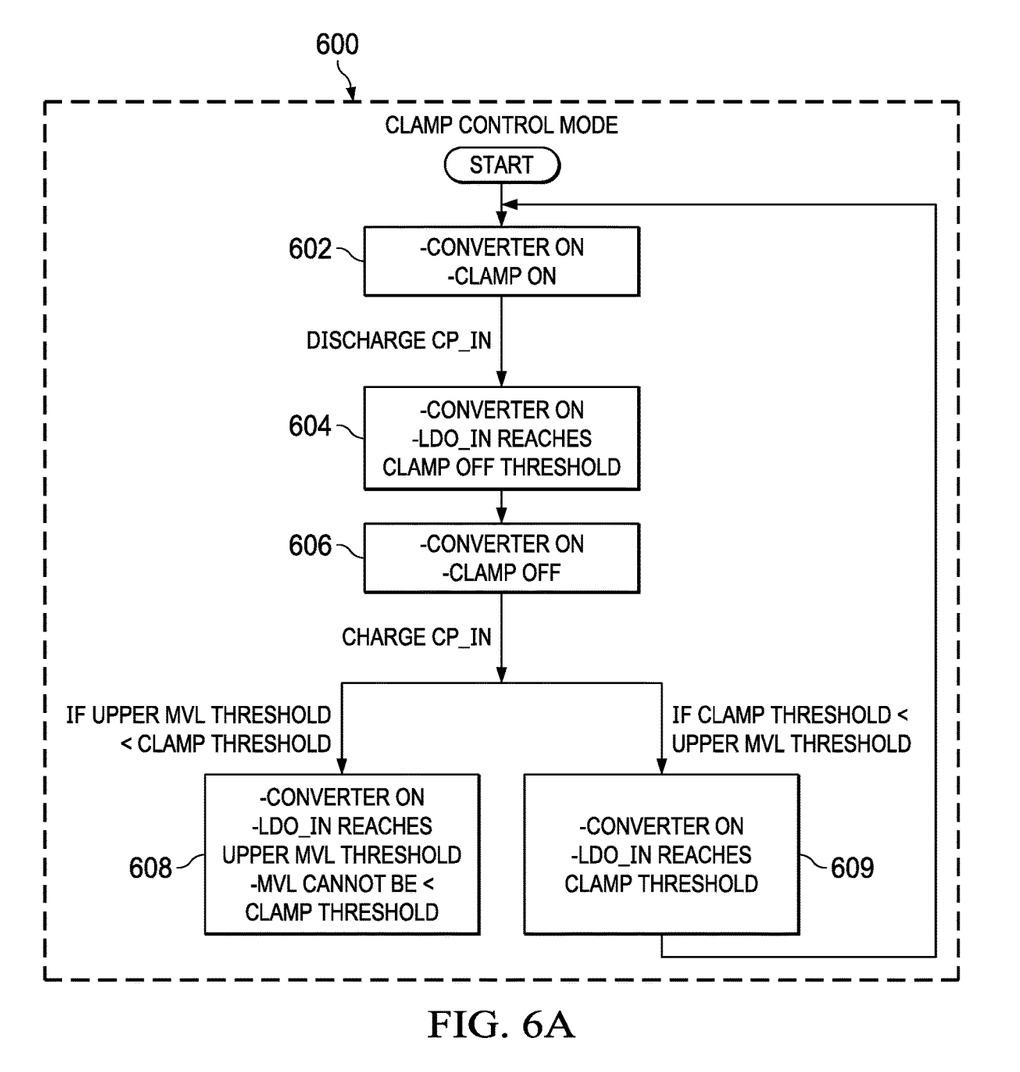
FIGS. 6A and 6B are flow charts showing control methods in accordance with various examples.
Figure 6B:
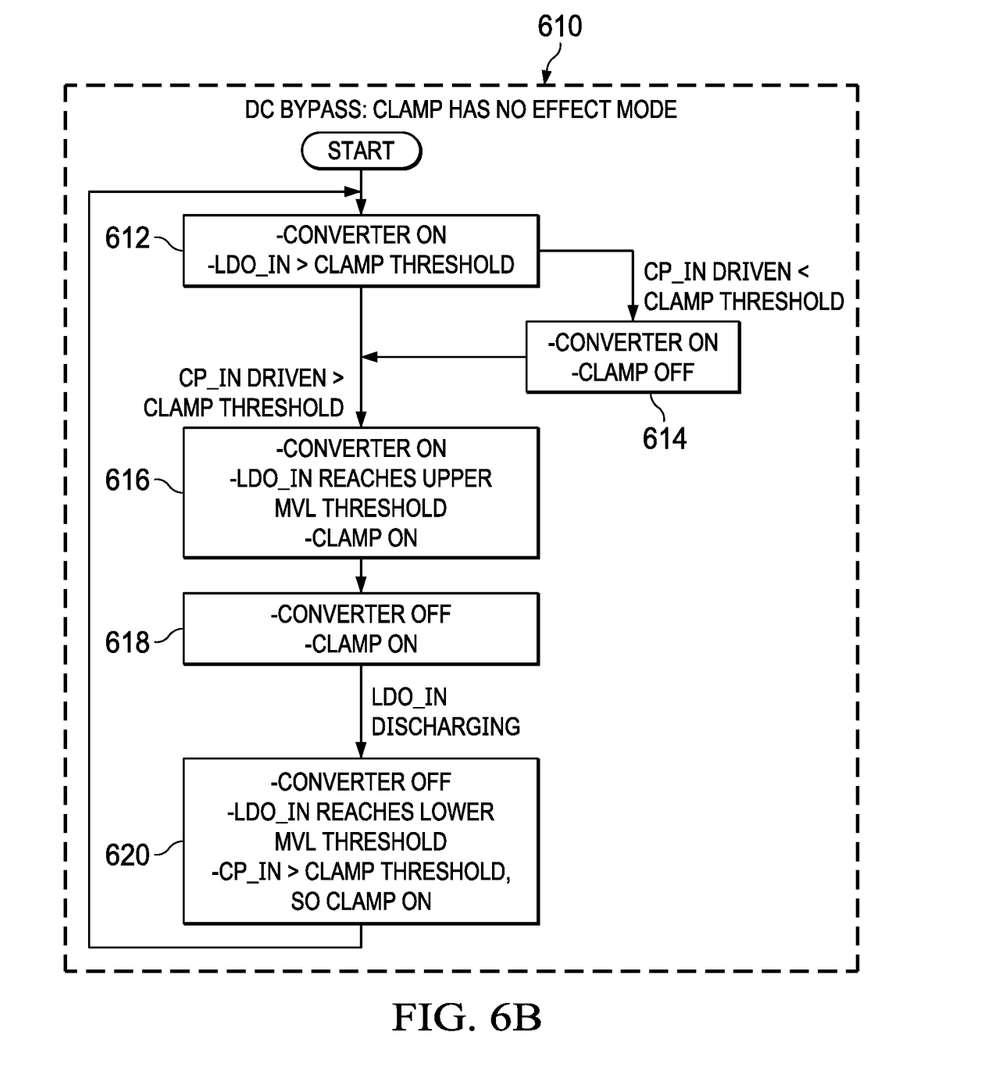

FIGS. 6A and 6B are flow charts showing control methods 600 and 610 in accordance with various examples. More specifically, the method 600 of FIG. 6A is applicable when an clamp device (e.g., the clamp device 102 in FIG. 1) or an AC rectifier and clamp device (e.g., AC rectifier and clamp device) is used to provide the converter input supply voltage (CV_IN), and method 610 of FIG. 6B is applicable when an clamp device (e.g., the clamp device 102 in FIG. 1) or an AC rectifier and clamp device (e.g., AC rectifier and clamp device) is bypassed (e.g., by applying a DC voltage supply to the input of the N:1 converter).

As shown in FIG. 6A, the method 600 (AC source used) starts at block 602 with the converter on (clamp control mode 1 is used) and clamping on (e.g., provided by the clamp device 102 of FIG. 1, or the AC rectifier and clamp device 401 of FIG. 4). With the operations of block 602, CP_IN discharges until block 604, where the converter is on and LDO_IN reaches a clamping threshold. At block 606, the converter is on and clamping is off. With the operations of block 606, CP_IN charges. If an upper MVL threshold (for monitoring LDO_IN) is less than a clamping threshold, the method 600 proceeds from block 606 to block 608, where the converter is on and LDO_IN reaches the upper MVL threshold. Note: the upper MVL threshold should not be the same as the clamping threshold. In the method 600, block 608 represents an invalid state showing that MVL should not be designed to be less than the clamp point. If the clamping threshold is less than the upper MVL threshold (for monitoring LDO_IN), the method 600 proceeds from block 606 to block 609, where the converter is on and LDO_IN reaches the clamping threshold. Note: the upper MVL threshold should not be the same as the clamping threshold. From block 609, the method 600 returns to block 602.

In FIG. 6B, the method 610 corresponds to a DC bypass scenario. In such scenarios, a clamping device (e.g., the clamping device 102 in FIG. 1) or AC rectifier and clamping device (e.g., the AC rectifier and clamping device 401 in FIG. 4) is bypassed. In such case, the clamping device or AC rectifier and clamping device may be on but does not perform clamping. As shown, the method 610 starts at block 612 with the converter on (a first DC bypass mode or converter on mode is used) and LDO_IN is greater than a clamping threshold. With the operations of block 612, if CP_IN is driven less than the clamp threshold, the method 610 proceeds to block 614, where the converter is on and clamping is off. Note: clamping operations have no effect in the DC bypass modes.

In the DC bypass scenario of method 610 in FIG. 6B, CP_IN is directly driven by the DC source, so the user has control over it. In contrast, in the clamp control scenario of method 600 in FIG. 6A, CP_IN is driven by a clamp device (e.g., the clamp device 102 in FIG. 1, or the AC rectifier and clamp device 401 in FIG. 4), so the clamp control has control over the CP_IN voltage rather than the user. With the operations of block 612, if CP_IN driven is greater than the clamp threshold, the method 610 proceeds to block 616, where the converter is on, clamping is off and LDO_IN reaches an upper MVL threshold. From block 616, the method 610 proceeds to block 618, where the converter is turned off (a second DC bypass mode or converter off mode is used). With the operations of block 618, LDO_IN discharges. At block 620, the converter is off, LDO_IN reaches a lower MVL threshold, so the converter is turned on. From block 620, the method 610 returns to block 612.

In some examples, LDO_OUT is a value between 1.25V and 5V, LDO_IN is 0.6V higher than LDO_OUT (due to V_DROPOUT), and CP_IN is 4 times LDO_IN (e.g., 16V-22.4V). Also, for the clamp control modes, the clamping threshold is set to LDO_OUT+V_DROPOUT when monitoring LDO_IN in clamp control mode 1 (converter on), and is set to N*(LDO_OUT+V_DROPOUT) when monitoring CP_IN in clamp control mode 2 (converter off). Also, in some examples, the upper MVL threshold is set to the max voltage for the process components used on LDO_IN (e.g., 5.75V). Also, in some examples, the lower MVL threshold is set to 5.65V. In different examples, the values for LDO_OUT, LDO_IN, CP_IN, the clamping threshold, the upper MVL threshold, and the lower MVL threshold vary.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ." The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a clamp circuit configured to regulate a converter input supply voltage based on control signals;
 a converter configured to adjust the converter input supply voltage to a converter output supply voltage;
 a controller configured to adjust the control signals for the clamp circuit using a first mode based on the converter output supply voltage and a second mode based on the converter input supply voltage.

2. The system of claim 1, wherein the controller is configured to switch between the first mode and the second mode based on a monitored parameter of the converter output supply voltage.

3. The system of claim 2, wherein the controller comprises a voltage monitor circuit, wherein the voltage monitor circuit is configured to provide the monitored parameter of the converter output supply voltage based on a comparison of the converter output supply voltage with at least one threshold.

4. The system of claim 3, wherein the controller is configured to turn the converter off and switch from the first mode to the second mode in response to the monitored parameter indicating that the converter output supply voltage is greater than a threshold.

5. The system of claim 3, wherein the controller is configured to turn the converter on and switch from the second mode to the first mode in response to the monitored parameter indicating that the converter output supply voltage is less than a lower threshold.

6. The system of claim 1, wherein the controller is configured to turn the converter on in a first direct-current (DC) bypass mode, and to turn the converter off in a second DC bypass mode.

7. The system of claim 1, wherein the clamp circuit, the converter, and the controller are components of an integrated circuit.

8. The system of claim 1, further comprising alternating current (AC) rectifier components coupled to clamp switches of the clamp circuit, and wherein the AC rectifier components are configured to rectify an input AC signal and wherein the clamp circuit is configured to regulate the converter input supply voltage using the clamp switches.

9. The system of claim 1, wherein the controller is configured to provide the control signals in the first mode based on $LDO_{IN}=LDO_{OUT}+V_{DROPOUT}$, where $LDO_{IN}$ is the convert output supply voltage, $LDO_{OUT}$ is the output voltage of an LDO, and $V_{DROPOUT}$ is a target voltage drop of the LDO, and wherein the controller is configured to provide the control signals in the second mode based on $CP_{IN}=N*(LDO_{OUT}+V_{DROPOUT})$, where $CP_{IN}$ is the converter input supply voltage where N is an integer.

10. A device, comprising:
 a clamp circuit configured to regulate a converter input supply voltage based on control signals;
 a converter configured to reduce the converter input supply voltage to a low-dropout regulator (LDO) supply voltage;
 an LDO configured to provide an output voltage based on the LDO input supply voltage; and
 a controller configured to selectively adjust the control signals for the clamp circuit using a first mode based on the LDO input supply voltage and a second mode based on the converter input supply voltage.

11. The device of claim 10, wherein the controller is configured to switch between using the first mode and the second mode based on a monitored parameter of the LDO input supply voltage.

12. The device of claim 11, wherein the controller comprises a voltage monitor circuit, wherein the voltage monitor circuit is configured to provide the monitored parameter of the LDO input supply voltage based on a comparison of the LDO input supply voltage with at least one threshold.

13. The device of claim 12, wherein the controller is configured to turn off the converter and to switch from the first mode to the second mode in response to the monitored parameter indicating that the LDO input supply voltage is greater than a threshold.

14. The device of claim 12, wherein the controller is configured to turn on the converter and to switch from the second mode to the first mode in response to the monitored parameter indicating that the LDO input supply voltage is less than a threshold.

15. The device of claim 10, wherein the controller is configured to turn on the converter in a first direct-current (DC) bypass mode, and to turn off the converter in a second DC bypass mode.

16. A device, comprising:
 a clamp circuit with two switches;
 a converter circuit coupled to an output node of the clamp circuit;
 a low-dropout regulator (LDO) circuit coupled to an output node of the converter circuit; and a controller coupled to an input node of the LDO circuit and to an input node of the converter circuit, wherein the controller comprises:
    a multiplexer with an LDO input supply voltage node and a converter input supply voltage node;
    a voltage divider coupled to an output node of the multiplexer; and
    a comparator coupled to an output node of the voltage divider, wherein an output node of the comparator couples to the clamp circuit.

17. The device of claim 16, wherein the multiplexer receives a control signal to switch between passing the converter input supply voltage or the LDO input supply voltage to the voltage divider, wherein the control signal is based on a monitored parameter of the LDO input supply voltage.

18. The device of claim 17, further comprising a voltage monitor circuit with an input node coupled to an input node of the LDO circuit, wherein the voltage monitor circuit comprises:
    a voltage divider coupled to the input node of the voltage monitor circuit; and
    a comparator coupled to an output node of the voltage divider.

19. The device of claim 18, wherein the voltage monitor circuit further comprises a switch coupled across a resistor of the voltage divider to implement hysteresis for the comparator, and wherein the output node of the comparator couples to an enable node of the converter circuit and a mode select node of the controller.

20. The device of claim 17, wherein the controller is configured to turn off the converter circuit and to switch clamp control from an LDO input supply voltage mode to a converter input supply voltage mode in response to the monitored parameter indicating that the LDO input supply voltage is greater than a threshold.

21. The device of claim 17, wherein the controller is configured to turn on the converter and to switch clamp control from a converter input supply voltage mode to an LDO input supply voltage mode in response to the monitored parameter indicating that the LDO input supply voltage is less than a threshold.

* * * * *